United States Patent
Goffe

(10) Patent No.: US 9,849,444 B2
(45) Date of Patent: Dec. 26, 2017

(54) UREA HYDROLYSIS REACTOR FOR SELECTIVE CATALYTIC REDUCTION

(71) Applicant: Randal A. Goffe, Everett, WA (US)

(72) Inventor: Randal A. Goffe, Everett, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 14/672,968

(22) Filed: Mar. 30, 2015

(65) Prior Publication Data

US 2016/0074839 A1 Mar. 17, 2016

Related U.S. Application Data

(63) Continuation-in-part of application No. 14/486,858, filed on Sep. 15, 2014.

(51) Int. Cl.

| | | |
|---|---|---|
| *B01J 23/83* | (2006.01) | |
| *B01J 35/00* | (2006.01) | |
| *B01J 23/78* | (2006.01) | |
| *B01J 23/10* | (2006.01) | |
| *B01J 21/06* | (2006.01) | |
| *B01J 31/06* | (2006.01) | |
| *B01D 53/94* | (2006.01) | |
| *B01J 8/02* | (2006.01) | |
| *B01J 23/00* | (2006.01) | |
| *C01C 1/08* | (2006.01) | |
| *B01J 29/06* | (2006.01) | |

(52) U.S. Cl.
CPC .......... *B01J 23/83* (2013.01); *B01D 53/9409* (2013.01); *B01D 53/9431* (2013.01); *B01J 8/02* (2013.01); *B01J 21/063* (2013.01); *B01J 23/00* (2013.01); *B01J 23/10* (2013.01); *B01J 23/78* (2013.01); *B01J 29/06* (2013.01); *B01J 31/06* (2013.01); *B01J 35/0006* (2013.01); *C01C 1/086* (2013.01); *B01D 2251/2067* (2013.01); *B01D 2255/20707* (2013.01); *B01D 2255/20753* (2013.01); *B01D 2255/407* (2013.01); *B01J 2208/00823* (2013.01); *B01J 2208/02* (2013.01); *B01J 2231/005* (2013.01); *B01J 2531/002* (2013.01); *Y02P 20/52* (2015.11)

(58) Field of Classification Search
CPC ........ B01D 53/9431; B01D 2251/2067; B01D 2258/012; C01C 1/086; B01J 23/02; B01J 21/063; B01J 31/06; B01J 23/83; B01J 29/70; B01J 23/10; B01J 2231/005; B01J 2531/002; B01J 2219/24
See application file for complete search history.

(56) References Cited

U.S. PATENT DOCUMENTS

| | | | | |
|---|---|---|---|---|
| 4,451,580 | A * | 5/1984 | Butler | ...................... B01J 23/76 502/332 |
| 8,017,097 | B1 | 9/2011 | Southward et al. | |
| 2009/0205324 | A1 | 8/2009 | Girard et al. | |
| 2010/0146948 | A1 | 6/2010 | DaCosta et al. | |
| 2011/0005211 | A1 * | 1/2011 | Tissler | ................. B01J 37/0018 60/297 |

FOREIGN PATENT DOCUMENTS

| | | |
|---|---|---|
| WO | 2009/050323 A1 | 4/2009 |
| WO | 2009/118195 A1 | 10/2009 |

OTHER PUBLICATIONS

Mukherjee et al., "Correlation between slurry rheology, green density and sintered density of tape case yttria stabilzied zirconia," Ceramics International 27 (2001) 731-739.*

Partial European Search Report dated Mar. 16, 2016, issued in corresponding European Application No. 15184785.2, filed Sep. 11, 2015, 6 pages.

Extended European Search Report dated Jul. 11, 2016, issued in corresponding Application No. EP 15 18 4785.2, filed Sep. 11, 2015, 11 pages.

* cited by examiner

*Primary Examiner* — Anthony J Zimmer
(74) *Attorney, Agent, or Firm* — Christensen O'Connor Johnson Kindness PLLC

(57) ABSTRACT

This disclosure features a urea conversion catalyst located within a urea decomposition reactor (e.g., a urea decomposition pipe) of a diesel exhaust aftertreatment system. The urea conversion catalyst includes a refractory metal oxide and a cationic dopant. The urea conversion catalyst can decrease the temperature at which urea converts to ammonia, can increase the urea conversion yield, and can decrease the likelihood of incomplete urea conversion.

5 Claims, 13 Drawing Sheets

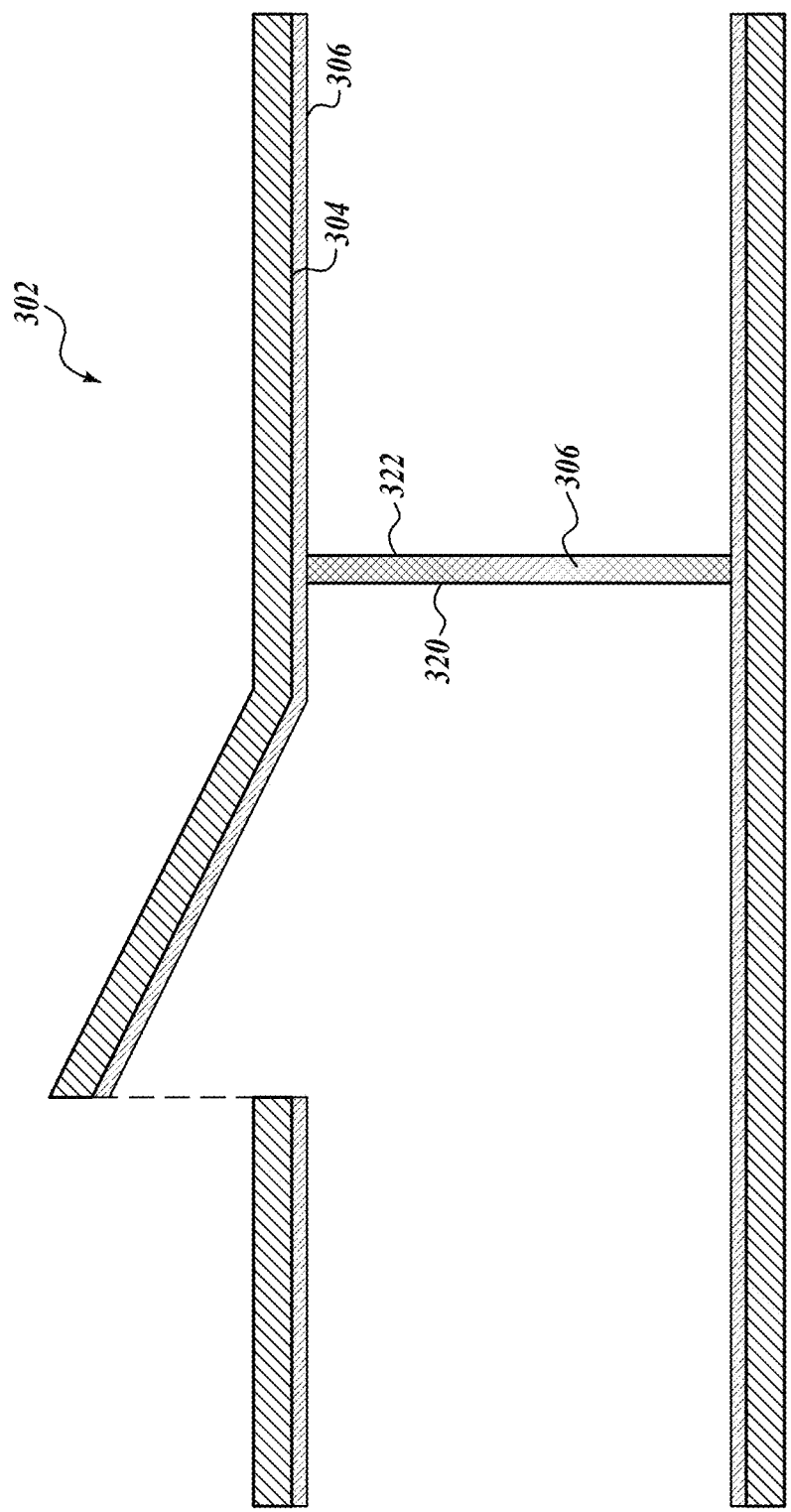

UREA HYDROLYSIS REACTOR FOR SELECTIVE CATALYTIC REDUCTION

CROSS-REFERENCE TO RELATED APPLICATION

This application is a continuation-in-part of U.S. patent application Ser. No. 14/486,858, filed Sep. 15, 2014, the disclosure of which is incorporated by reference herein in its entirety.

BACKGROUND

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxide ("NOx"), and sulfur oxide ("SOx"). Aftertreatment systems may be utilized to reduce or eliminate emissions of these and other combustion products.

FIG. 1A shows a block diagram providing a brief overview of a vehicle powertrain. The components include an internal combustion engine 20 in flow communication with one or more selected components of an exhaust aftertreatment system 24. The exhaust aftertreatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow-through device that includes either a honeycomb-like or plate-like substrate. The substrate has a surface area that includes (e.g., coated with) a catalyst. The catalyst can be an oxidation catalyst, which can include a precious metal catalyst, such as platinum, for rapid conversion of hydrocarbons, carbon monoxide, and nitric oxides in the engine exhaust gas into carbon dioxide, nitrogen, water, or $NO_2$.

The treated exhaust gases can then proceed to the particulate filter 100, such as a diesel particulate filter (DPF) 100. The DPF 100 is utilized to capture unwanted diesel particulate matter from the flow of exhaust gas exiting engine 20, by flowing exhaust across the walls of DPF channels. The diesel particulate matter includes sub-micron sized solid and liquid particles found in diesel exhaust. The DPF 100 can be manufactured from a variety of materials including but not limited to cordierite, silicon carbide, and/or other high temperature oxide ceramics. The DPF 100 also includes at least one catalyst to catalyze the oxidation of trapped particulate and/or exhaust gas components. For example, the catalyst may include a refractory metal oxide with platinum group metal, although any known oxidation catalyst may be used.

System 24 can include one or more sensors (not illustrated) associated with components of the system 24, such as one or more temperature sensors, NOx sensor, oxygen sensor, mass flow sensor, and a pressure sensor.

The exhaust aftertreatment system 24 can further include an optional Selective Catalytic Reduction (SCR) system 104. The SCR system 104 includes a catalytic surface which interacts with NOx gases to convert the NOx gases into $N_2$ and water. The overall reactions of NOx reductions in an SCR are shown below.

$$4NO + 4NH_3 + O_2 \rightarrow 4N_2 + 6H_2O \quad (1)$$

$$6NO_2 + 8NH_3 \rightarrow 7N_2 + 12H_2O \quad (2)$$

$$2NH_3 + NO + NO_2 \rightarrow 2N_2 + 3H_2O \quad (3)$$

As shown in Equations (1), (2), and (3), reduction of NOx gases into nitrogen and water requires an ammonia reductant. Thus, a gaseous reductant, such as anhydrous ammonia, aqueous ammonia, or urea, is added (e.g., dosed) to a stream of exhaust gas in a urea decomposition reactor 102 (e.g., a urea decomposition pipe) upstream of an SCR system 104.

FIG. 1B shows an expanded view of urea decomposition reactor 102. As an engine exhaust 204 flows through urea decomposition reactor 102 (as shown, a urea decomposition pipe) towards a mixer 206, a doser 208 injects a reductant 210 in the direction of mixer 206, such that the reductant can be uniformly mixed with the engine exhaust to reduce NOx gases present in the engine exhaust. The dosing frequency and amount of reductant can be adjusted depending on a detected amount of NOx and the engine exhaust temperature.

Urea can be used as a portable and convenient source for ammonia ($NH_3$) reductant in engine aftertreatment systems for decreasing (e.g., eliminating) NOx emission from diesel engines. A two-step thermal process drives the stoichiometric decomposition of urea to produce $NH_3$ in urea decomposition pipe 102: thermolysis of urea into HNCO and $NH_3$, followed by hydrolysis of HNCO (isocyanic acid) into $CO_2$ and $NH_3$, as shown in Scheme 1.

Scheme 1

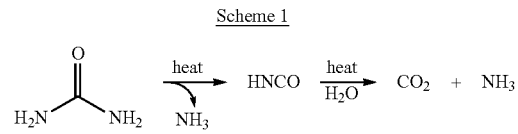

However, both thermodynamic and kinetic limitations can decrease the conversion yield of urea to ammonia. Because the urea conversion requires a relatively long residence time within urea decomposition pipe 102, conversion of urea to ammonia is often incomplete, resulting in overdosing of urea and release of $NH_3$, HNCO, and/or urea into the atmosphere (also known as a $NH_3$, HNCO, and/or urea slip).

Without wishing to be bound by theory, it is believed that the byproduct of incomplete urea decomposition is primarily isocyanic acid (HNCO), a relatively stable gas that rapidly hydrolyzes at the SCR catalyst surface to release more $NH_3$. Thus, isocyanic acid competes with the NOx conversion reaction at the SCR catalyst surface when NOx concentration in the SCR is at or near the peak level. The $NH_3$ that results from undetected urea byproduct decomposition can potentially combine with $NH_3$ from freshly dosed urea to cause an overabundance of $NH_3$ (i.e., overdosing), which results in an apparent failure of the SCR system. Overdosing is rendered even more likely because commercially available NOx sensors can cross-react with $NH_3$ at the tailpipe to report it as NOx, thereby providing a falsely high NOx reading. Thus, two contributing factors can cause apparent SCR failure: (1) unaccounted $NH_3$ from HNCO hydrolysis due to urea byproduct decomposition; and (2) the NOx sensor's inability to distinguish between $NH_3$ and NOx. Each of these two factors, alone or in combination, can lead an engine management system to increase the supply of urea, resulting in overdosing.

In addition to HNCO from incomplete urea decomposition, tar-like compounds are produced from urea byproducts at around 400° C. and above in an engine aftertreatment system (e.g., during a DPF regeneration procedure at up to about 600° C.). These highly undesirable materials can accumulate in the SCR and contribute to premature catalyst aging. Furthermore, during decomposition of pure urea and urea byproducts, very fine particulate matter are released and transported downstream by exhaust flow. The particulate matter can contribute to catalyst fouling/blinding, overdosing of $NH_3$, detection of SCR failure, and/or premature catalyst aging.

Furthermore, one important and persistent consequence of incomplete decomposition of urea is the occurrence of side reactions that form high molecular weight solid deposits, which in turn can have deleterious effects for SCR operation, engine performance, fuel efficiency, and impact system configuration and vehicle design. Deposit formation can vary with engine aftertreatment configuration, and can limit the degrees of freedom available for aftertreatment system and vehicle designers. While urea byproducts can decompose at high temperatures, efforts to decrease solid deposits can fail because at the high temperature of an engine exhaust, conditions that favor decomposition of a specific species in the deposit paradoxically also accelerate the formation of even higher molecular weight compounds within the deposit.

Reductants other than urea can be used to decrease (e.g., eliminate) solid deposit formation. For example, ammonia gas may be used to decrease solid deposit formation. However, compared to urea, ammonia gas is less portable and challenging to provide in a national or international commercial setting. As another example, metal amine complexes can be used to provide $NH_3$. However, metal amine complexes are prohibitively costly for general use and have been limited to niche applications. A variety of portable reactors (e.g., urea hydrolysis devices generate $NH_3$ from urea via electrochemical oxidation) have also been proposed for generating $NH_3$ during vehicle operation, but these reactors are costly, require additional power sources on-board a vehicle, increase overall weight of a vehicle, and/or are bulky.

Accordingly, there is a need for simple and cost-effective methods of generating ammonia from urea with increased yield and efficiency, and with little to no solid deposit formation in engine aftertreatment systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a urea decomposition reactor including a urea conversion catalyst; wherein the urea conversion catalyst includes a refractory metal oxide and a cationic dopant.

In another aspect, the present disclosure features an exhaust aftertreatment system including a urea decomposition reactor that includes a urea conversion catalyst; wherein the urea conversion catalyst includes a refractory metal oxide and a cationic dopant.

In another aspect, the present disclosure features a coating composition for a urea decomposition reactor, including a dispersion including a urea conversion catalyst that includes a refractory metal oxide and a cationic dopant; an inorganic oxide binder particle; a polymeric dispersion agent; a high molecular weight hydrophilic polymer viscosity aid; and a solvent.

In yet another aspect, the present disclosure features a method of converting urea to ammonium in an exhaust aftertreatment system, including exposing a urea-containing solution to a urea decomposition reactor including a urea conversion catalyst. The urea conversion catalyst includes a refractory metal oxide and a cationic dopant.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is an expanded cross-sectional view of an embodiment of a urea decomposition reactor of the present disclosure;

DETAILED DESCRIPTION

Figure 1A:
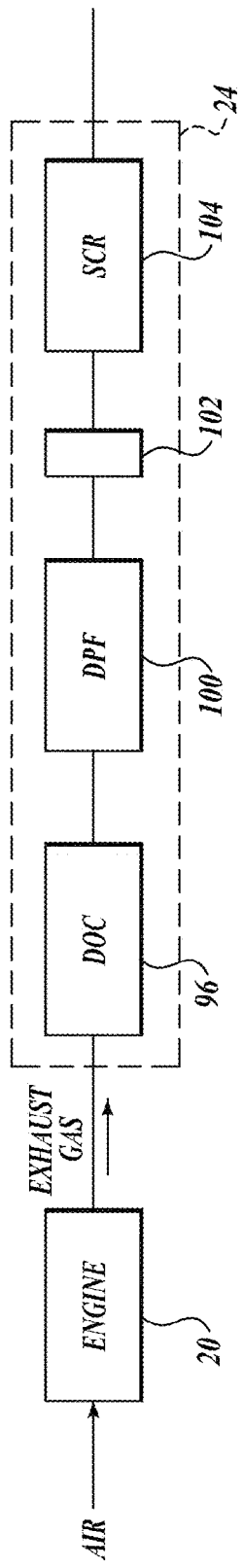
FIG. 1A is a block diagram of one example of an aftertreatment system coupled to an internal combustion engine.
Figure 1B:
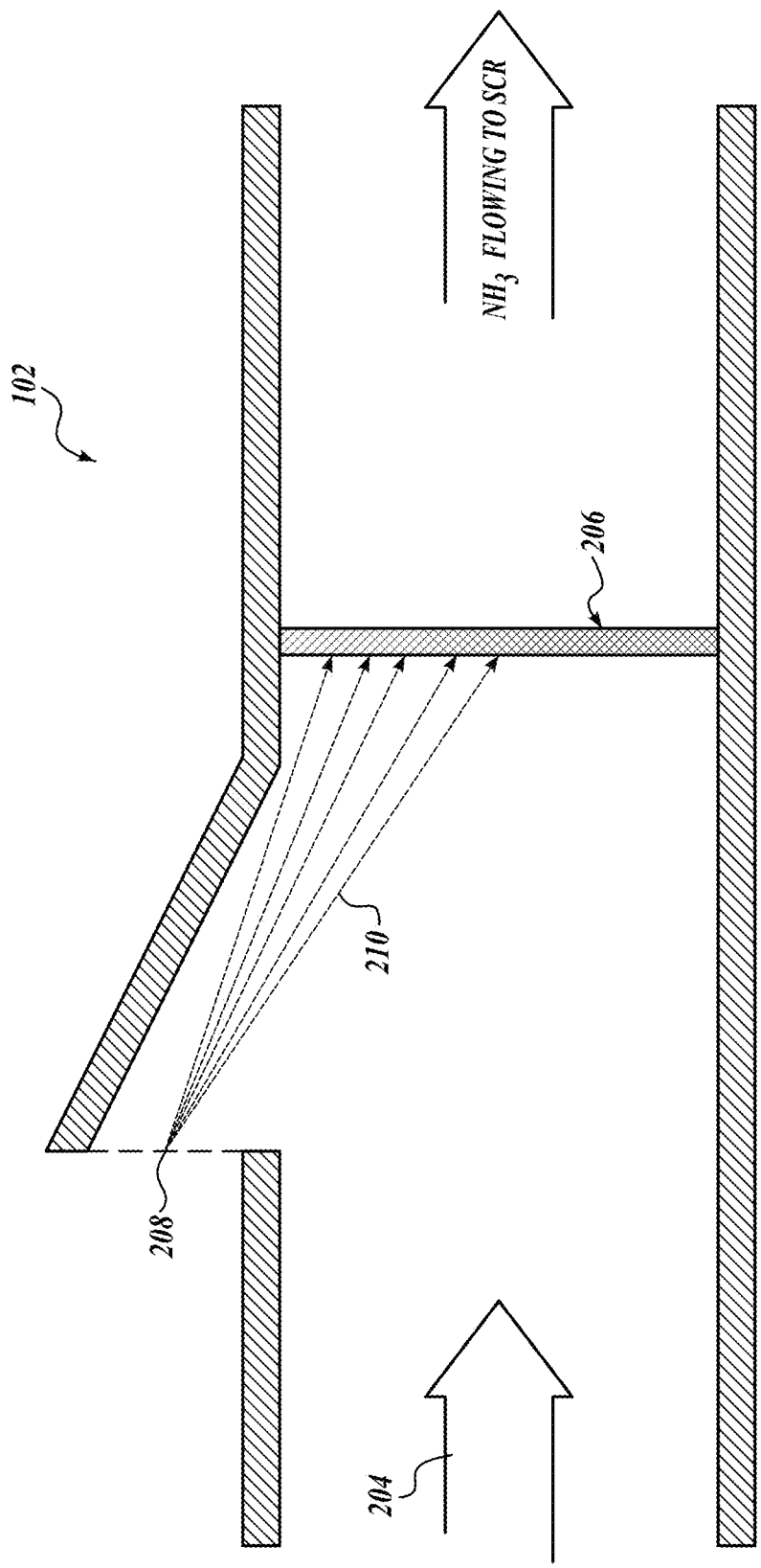
FIG. 1B is an expanded cross-sectional view of a urea decomposition reactor in the aftertreatment system of FIG. 1A.

This disclosure features an exhaust aftertreatment system that includes a urea conversion catalyst located within a urea decomposition reactor (e.g., a urea decomposition pipe). The urea conversion catalyst includes a refractory metal oxide and a cationic dopant. The urea conversion catalyst can decrease the temperature at which urea converts to ammonia, can increase the urea conversion yield, and can decrease the likelihood of incomplete urea conversion.

A urea decomposition reactor including a urea conversion catalyst can provide numerous advantages. For example, the urea decomposition reactor can decrease the likelihood of urea overdosing and reduce the amount of urea that is utilized, because little to no solid deposit is created during operation of the engine aftertreatment system. Thus, the amount of urea carried by a vehicle can be reduced, decreasing both vehicle weight and cost, and improving fuel efficiency.

The urea decomposition reactor can be constructed from existing engine aftertreatment components and can be relatively easily implemented in existing engine aftertreatment systems. The urea decomposition reactor can be cost effective. The urea decomposition reactor can be amenable to coating with a wide variety of metal oxides and combinations thereof. Furthermore, a wide range of exhaust aftertreatment system configurations can be accommodated, and the lifetime of selective reductive catalyst components can be extended because little to no solid deposits are formed due to incomplete urea hydrolysis. In some embodiments, smaller, more compact, and lighter weight engine aftertreatment systems having smaller urea decomposition reactors can be designed.

In some embodiments, the urea decomposition reactor can be easily and relatively inexpensively replaced during routine vehicle servicing. Moreover, the urea decomposition reactor can be reused by recoating with an active catalyst.

The components of the urea conversion catalyst will now be described in greater detail. As discussed above, the urea conversion catalyst includes a refractory metal oxide and a cationic dopant. The refractory metal oxide can include, for example, cerium oxide (e.g., $CeO_2$), titanium oxide (e.g., $TiO_2$), zirconium oxide (e.g., $ZrO_2$), aluminum oxide ($Al_2O_3$), silicon oxide ($SiO_2$), hafnium oxide (e.g., $HfO_2$), vanadium oxide (e.g., $V_2O_3$, $VO_2$), niobium oxide (e.g., NbO), tantalum oxide (e.g., $Ta_2O$), chromium oxide (e.g., $Cr_2O_3$), molybdenum oxide (e.g., $MoO_2$), tungsten oxide (e.g., $WO_3$), ruthenium oxide (e.g., $RuO_2$), rhodium oxide (e.g., $Rh_2O_3$), iridium oxide (e.g., $IrO_2$), and/or nickel oxide (e.g., NiO). In some embodiments, the refractory metal oxide is titanium oxide, zirconium oxide, and/or cerium oxide. In certain embodiments, the refractory metal oxide is zirconium oxide or cerium oxide.

In some embodiments, the urea conversion catalyst includes a zeolite (e.g., protonated zeolite), which can improve the performance of the urea conversion catalyst. As used herein, zeolite refers to microporous, aluminosilicate minerals that can accommodate a variety of cations (e.g., $Na^+$, $K^+$, $Ca^{2+}$, $Mg^{2+}$, etc.) that can be exchanged for others in a solution. Without wishing to be bound by theory, it is believed that the zeolite can undergo acid-base reactions with the urea conversion catalyst, and the water-binding capacity of the zeolite can help facilitate a rapid catalyst-assisted urea conversion.

The urea conversion catalyst includes a cationic dopant. The cationic dopant can be an oxide that includes $Y^{3+}$, $Sc^{3+}$, $Sr^{2+}$, $Ca^{2+}$, $Mg^{2+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Sn^{4+}$, $Co^{2+}$, $Ni^{2+}$, $Ba^{2+}$, $La^{3+}$, $Ce^{4+}$, and/or $Nb^{5+}$. In some embodiments, the dopant includes a rare-earth metal (e.g., Sc, Y, La, Ce, Pr, Nd, Pm, Sm, Eu, Gd, Tb, Dy, Ho, Er, Tm, Yb, and/or Lu), at any positive oxidation state. For example, the cationic dopant can be $Y^{3+}$, $Sc^{3+}$, and/or $Ca^{2+}$. In some embodiments, the cationic dopant is $Y^{3+}$. In certain embodiments, the cationic dopant is $Sc^{3+}$. In some embodiments, the cationic dopant is $Ca^{2+}$.

The urea conversion catalyst can include 0.1 mol % or more (e.g., 0.5 mol % or more, 1 mol % or more, 2 mol % or more, 5 mol % or more, 7 mol % or more, 10 mol % or more, 15 mol % or more, or 20 mol % or more) and/or 25 mol % or less (e.g., 20 mol % or less, 15 mol % or less, 10 mol % or less, 7 mol % or less, 5 mol % or less, 2 mol % or less, 1 mol % or less, or 0.5 mol % or less) of the cationic dopant, relative to the total composition of the urea conversion catalyst. For example, the urea conversion catalyst can include between 0.1 mol % and 25 mol % (e.g., between 0.1 mol % and 15 mol %, between 0.1 mol % and 10 mol %, between 5 and 10 mol %, or between 5 and 15 mol %) of the cationic dopant. In some embodiments, the urea conversion catalyst includes about 3 mol %, about 8 mol %, or about 20 mol % of the cationic dopant.

In some embodiments, the urea conversion catalyst is yttria-doped zirconia. In some embodiments, the urea conversion catalyst is yttria-doped ceria. The yttrium can be present in an amount of about 3 mol %, about 8 mol %, or about 20 mol %. In some embodiments, the yttrium is present in an amount of about 8 mol %.

In some embodiments, the urea conversion catalyst is scandia-doped zirconia or ceria. The scandium can be present in an amount of about 3 mol %, about 10 mol %, or about 20 mol %. In some embodiments, the scandium is present in an amount of about 10 mol %.

In some embodiments, the urea conversion catalyst is calcium-doped zirconia or ceria. The calcium can be present in an amount of about 5 mol %, about 10 mol %, about 16 mol %, or about 20 mol %. In some embodiments, the calcium is present in an amount of about 16 mol %.

The urea conversion catalyst can be in the form of a coating. Referring to FIG. 2, the urea conversion catalyst 306 can be coated onto at least a portion of a surface 304 within a urea decomposition reactor 302 (as shown, a urea decomposition pipe) and/or any components located within the urea decomposition reactor 302. For example, in FIG. 2 the urea conversion catalyst is a coating layer 306 on the inside surface 304 of the urea decomposition reactor 302 and can extend an entire inside surface 304 of the urea decomposition reactor 302.

As another example, the urea conversion catalyst can coat all surfaces where solid deposits may form (e.g., within the urea decomposition reactor and over exposed surfaces of the SCR-can, including connecting pipes and manifolds flow distributing baffle).

Figure 3A:
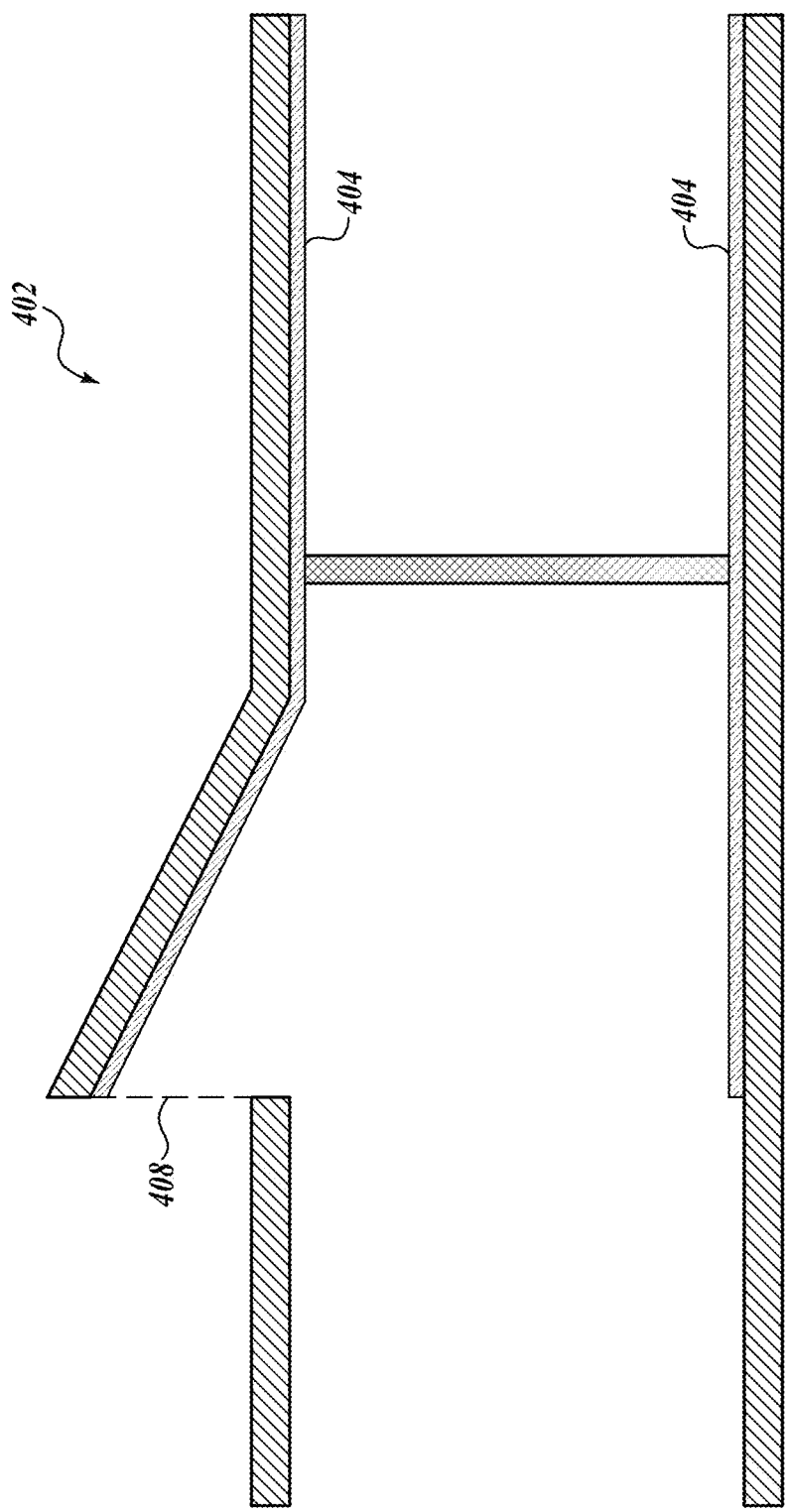
FIG. 3A is an expanded cross-sectional view of an embodiment of a urea decomposition reactor of the present disclosure.
Figure 3B:
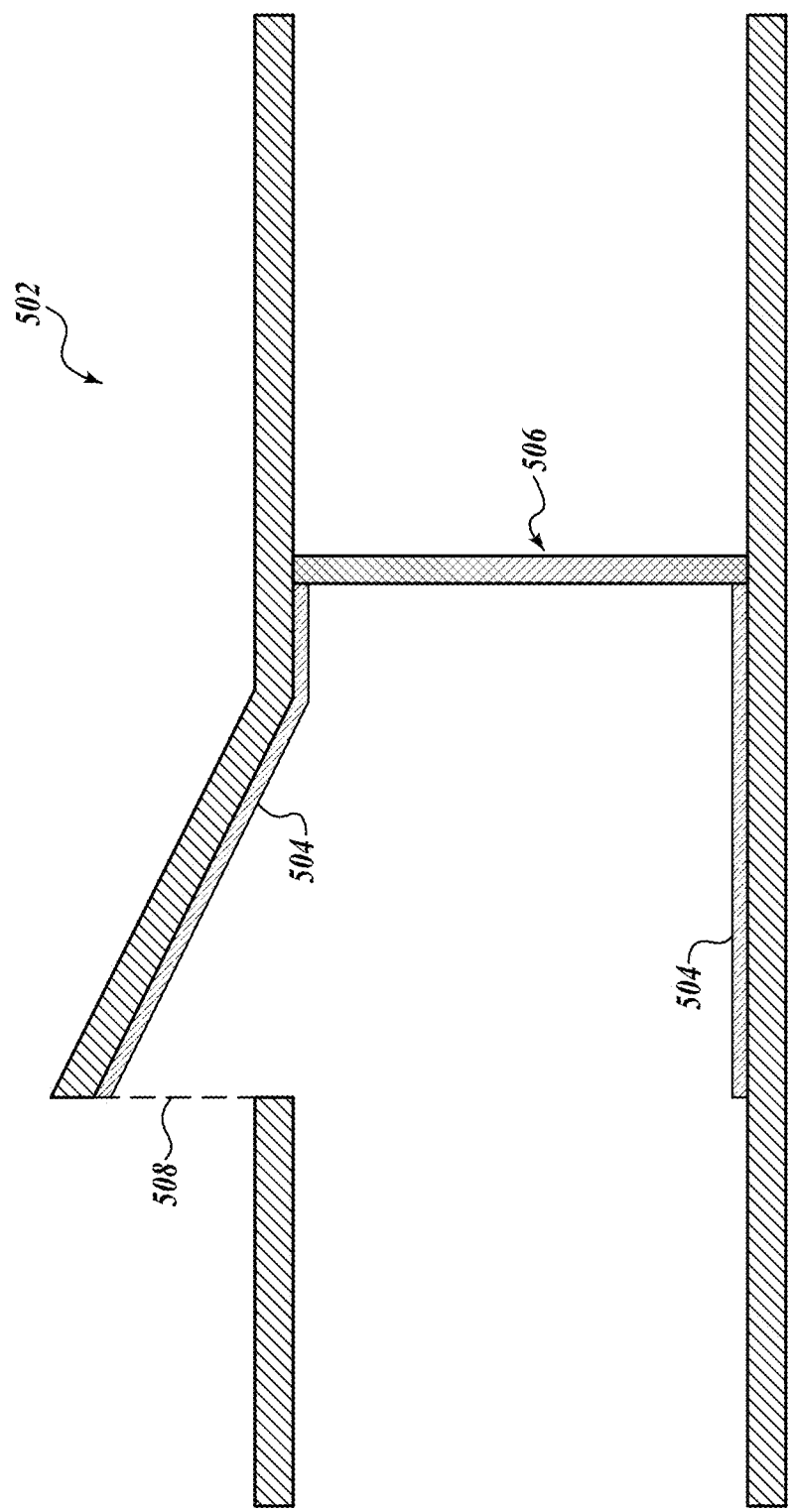
FIG. 3B is an expanded cross-sectional view of an embodiment of a urea decomposition reactor of the present disclosure.
Figure 3C:
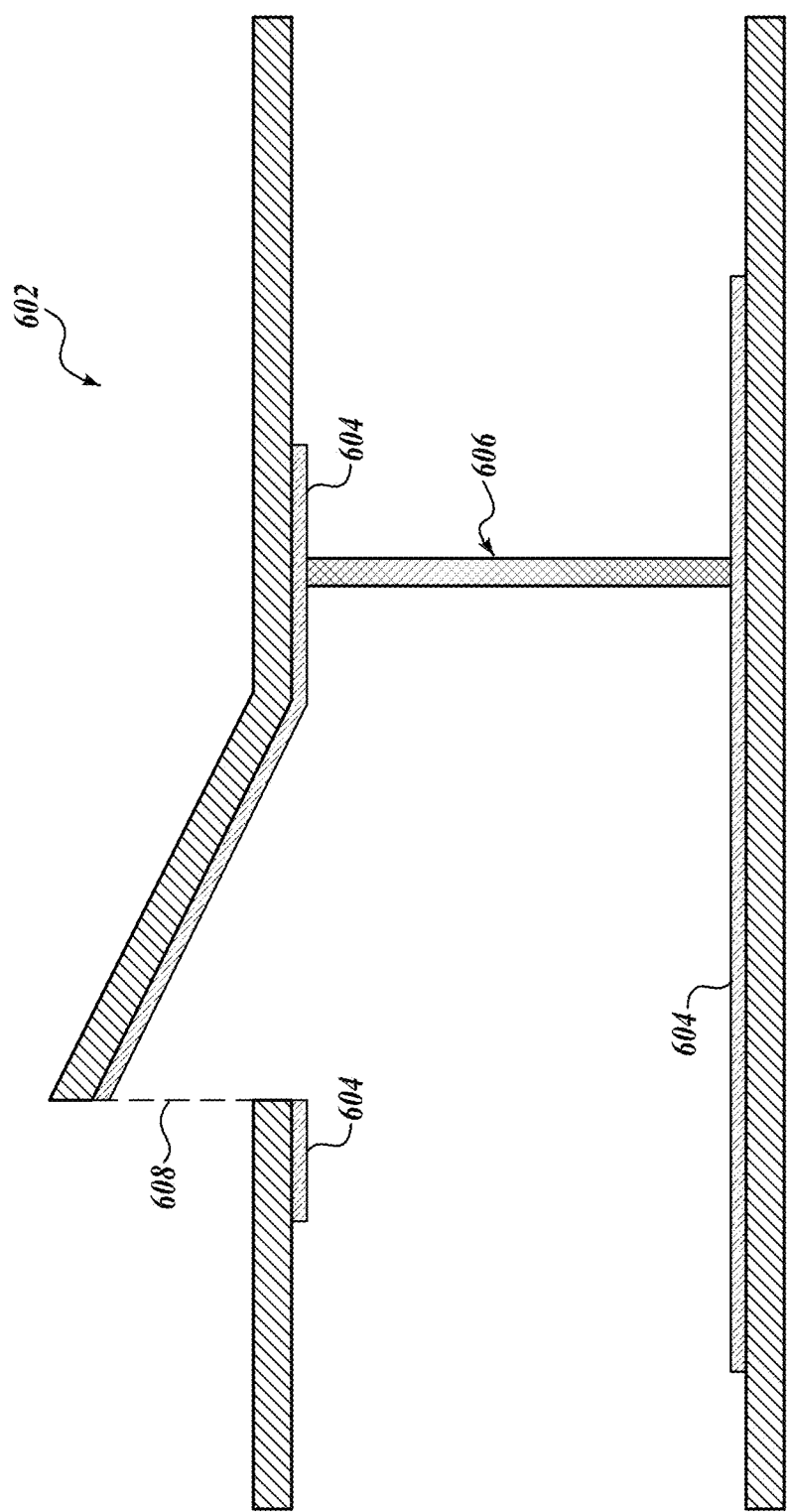
FIG. 3C is an expanded cross-sectional view of an embodiment of a urea decomposition reactor of the present disclosure.
Figure 3D:
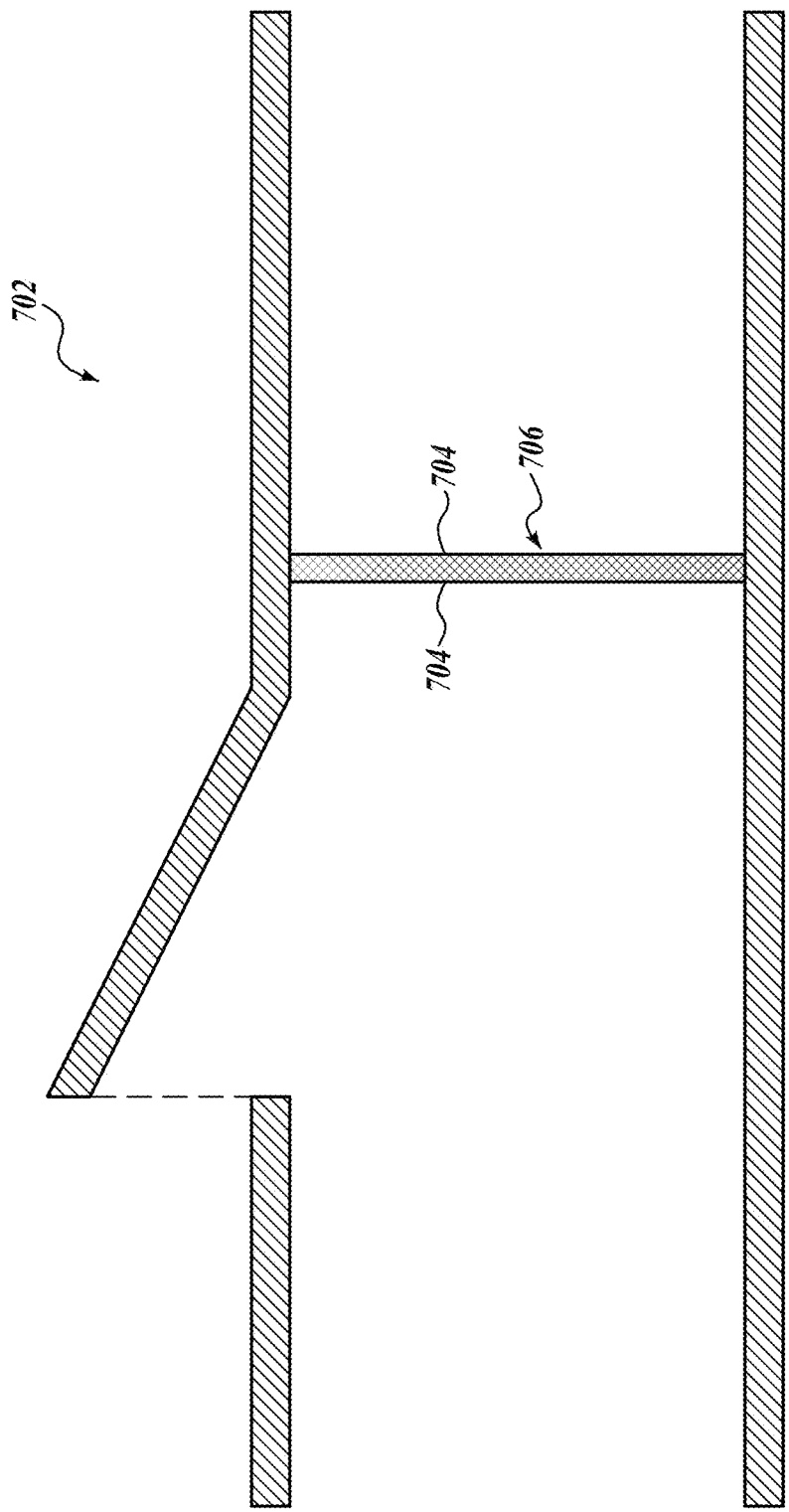
FIG. 3D is an expanded cross-sectional view of an embodiment of a urea decomposition reactor of the present disclosure.

In some embodiments, the urea conversion catalyst extends less than an entire inside surface of the urea decomposition reactor. For example, referring to FIG. 3A, the urea conversion catalyst 404 extends only downstream from the urea doser port 408. As another example, referring to FIG. 3B, the urea conversion catalyst 504 extends only downstream from the urea doser port 508 to mixer 506, but not further. In yet another example, referring to FIG. 3C, the urea conversion catalyst 604 can extend from any area upstream of the urea doser port 608 to an area downstream of the mixer 606. In yet another example, referring to FIG. 3D, the urea conversion catalyst 704 can coat one or more surfaces of the mixer 706.

In some embodiments, referring again to FIG. 2, additionally or alternatively to coating at least a portion of the inside of a urea decomposition reactor 302, the urea conversion catalyst can coat at least a portion of mixer 306. Mixer 306 can have a surface 320 facing an oncoming exhaust stream and a surface 322 facing away from the exhaust stream. The urea conversion catalyst can coat one of surfaces 320 and 322, or both surfaces 320 and 322 of mixer 306. As another example, the urea conversion catalyst can coat a portion of, or an entire surface on one or both sides 320 and/or 322 of the mixer 306. The coating of urea conversion catalyst on the mixer is such that the mixer can allow a flow of engine exhaust through the mixer with minimal back pressure. For example, the back pressure (e.g., a gas back pressure) can be about 20 kPa or less (e.g., about 15 kPa or less, about 10 kPa or less, about 7 kPa or less, about 5 kPa or less, about 3 kPa or less, or about 1 kPa or less).

Figure 4A:
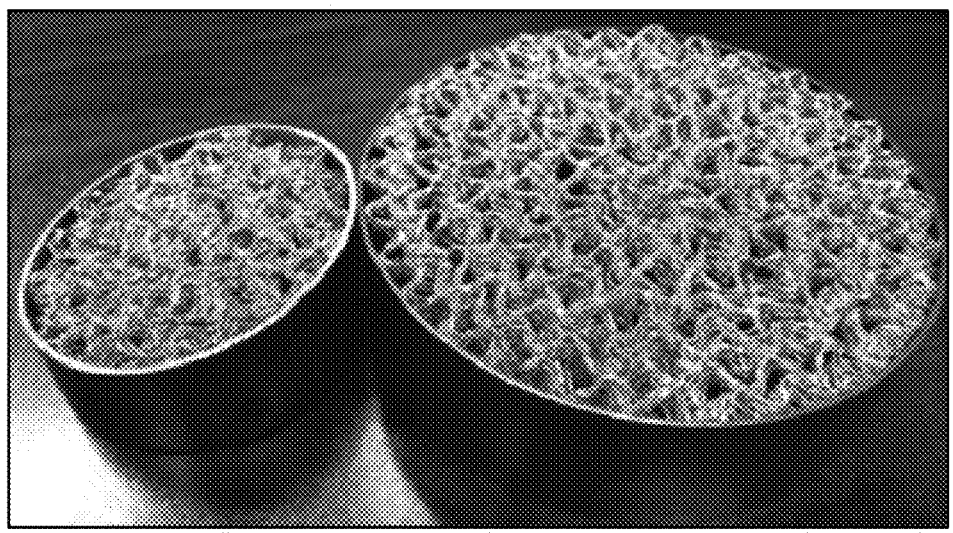
FIG. 4A is a photographic representation of an embodiment of a mixer useful in a urea decomposition reactor of the present disclosure.
Figure 4B:
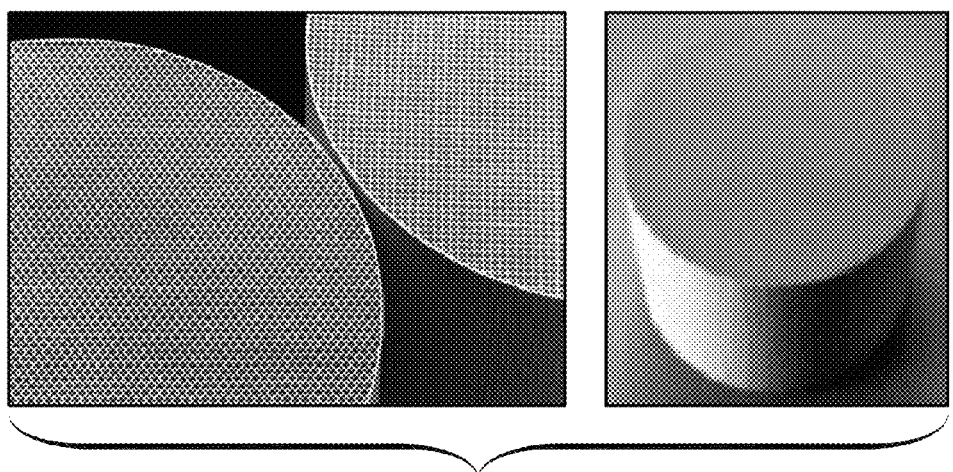
FIG. 4B is a photographic representation of an embodiment of a mixer useful in a urea decomposition reactor of the present disclosure.
Figure 4C:
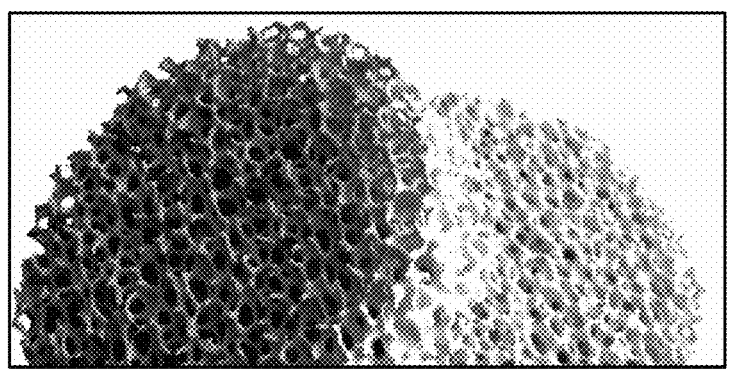
FIG. 4C is a photographic representation of an embodiment of a mixer useful in a urea decomposition reactor of the present disclosure.

The mixer can enhance homogeneous distribution and mixing of gases and liquids in a urea decomposition reactor. The mixer can allow a fluid and/or a gas stream to flow through. Thus, the mixer can be porous. In some embodiments, the mixer is in the form of a wire mesh (as exemplified in FIG. 4A), a ceramic monolith static mixer (as exemplified in FIG. 4B), or a ceramic static mixer such as a silicon carbide (SiC) foam ceramic mixer (as exemplified in FIG. 4C), a zirconia ceramic foam mixer, or an alumina ceramic foam mixer. Examples of mixers are described, for example, in U.S. patent application Ser. No. 14/486,217, entitled "Diesel Exhaust Mixing Chamber," filed Sep. 15, 2014, herein incorporated by reference in its entirety.

While urea decomposition reactors including one mixer are discussed above, it is understood that the urea decomposition reactor can have more than one mixer. The one or more mixers can increase the likelihood that urea solution can collide with the reactor at an optimized distance and dosing angle. For example, one mixer can mix a fluid in one direction, while a second mixer can mix a fluid in the reverse direction to provide efficient mixing and urea decomposition in a small, compact aftertreatment system.

In some embodiments, the urea conversion catalyst coating can have an average thickness of 5 µm or more (e.g., 10 µm or more, 20 µm or more, 30 µm or more, and 40 µm or more) and/or 50 µm or less (e.g., 40 µm or less, 30 µm or less, 20 µm or less, and 10 µm or less). The coating can be in a continuous layer or discontinuous layer formed of discrete islands of coatings. The coating can be porous or non-porous. For example, the coating can be the form of aggregated particles having interstitial pores. In some embodiments, the coating is a solid coating that is substantially (e.g., 95% or more, 97% or more, or 99% or more) free of pores. Thus, the coating can have a high surface area that can interact with urea to catalytically convert urea to ammonia.

While the urea hydrolysis catalyst, the DOC catalyst, and the DPF catalyst can be composed of similar refractory metal oxides, the urea hydrolysis catalyst is separately located from the DOC catalyst and the DPF catalyst in an exhaust aftertreatment system. Thus, the DOC and DPF catalysts would not oxidize the $NH_3$ generated from the urea in the urea hydrolysis reactor, which is required for the NOx reduction reaction in the SCR.

The urea decomposition reactor can operate at relatively low temperatures. For example, the urea decomposition reactor can convert 70% or more of urea (e.g., 80% or more, 90% or more, or 95% or more) to ammonia at a temperature of 500° C. or less (e.g., 450° C. or less, or 400° C. or less) over a period of 90 seconds or less (e.g., 60 seconds or less, 30 seconds or less, 15 seconds or less, 5 seconds or less, or 1 second or less). In some embodiments, the urea decomposition reactor can convert 70% or more of urea to ammonia at 450° C.

A urea decomposition reactor having a urea conversion catalyst can decrease formation of solid deposits in the urea hydrolysis regions (i.e., the urea hydrolysis reactor) of the engine aftertreatment system. In some embodiments, the urea conversion catalyst allows for complete conversion of urea to $NH_3$. In some embodiments, the urea decomposition reactor can provide improved NOx reduction during cold starts, when compared to a urea decomposition reactor without the urea conversion catalyst.

The urea decomposition reactor can have relatively few side reactions. For example, the urea decomposition can generate relatively little or no isocyanic acid and other incomplete side-products of decomposition (e.g., urea, biuret, triuret, ammelide, ammeline, melamine, cyanuric acid, etc.), such that relatively little (e.g., no) solid deposit resulting from incomplete urea decomposition is formed in the engine aftertreatment system. As another example, the urea conversion catalyst can convert 20% or less (e.g., 15% or less, 10% or less, 5% or less, or 2% or less) of urea to $N_2$ and $H_2$. In some embodiments, the urea decomposition reactor does not react with NOx, NO (e.g., oxidize NO), and/or hydrocarbons (e.g., oxidize hydrocarbons). In some embodiments, oxidation of excessive amounts of $NH_3$ can be reduced or eliminated, with 8 mol % yttria doped into zirconia (below 550° C.) and $NO_2$ generation can be reduced.

Process of Making the Urea Conversion Catalyst

The urea conversion catalyst can be incorporated into a urea decomposition reactor by coating the urea decomposition reactor with a composition including the urea conversion catalyst. The coated composition can then be sintered to provide a urea decomposition reactor including the urea conversion catalyst.

In some embodiments, the coating composition is a dispersion including a urea conversion catalyst that includes a refractory metal oxide and a cationic dopant, an inorganic oxide binder particle, a polymeric dispersion agent, a high molecular weight hydrophilic polymer viscosity aid, and a solvent. As used herein, "dispersion" refers to a composition including particles that are dispersed in a liquid. The dispersion can also be referred to as a washcoat composition (see, Example 2), when it is to be coated onto a surface of a urea decomposition reactor.

In some embodiments, the dispersion is a colloidal suspension. In certain embodiments, one or more constituents of the dispersion can be incorporated into the dispersion as a colloidal suspension (e.g., an inorganic oxide binder particle). As used herein, "colloidal suspension" refers to a substance that is microscopically dispersed throughout another substance, where the dispersed substance can remain in a stable dispersion for an extended period of time without precipitating from the dispersion. Refractory metal oxides including cationic dopants are as described above. The dispersion can include 2% or more (e.g., 5% or more, 10% or more, 20% or more, 30% or more, or 40% or more) and/or 50% or less (e.g., 40% or less, 30% or less, 20% or less, 10% or less, or 5% or less) by weight of the refractory metal oxide including cationic dopants, in solid form (e.g., solid particulate form). In some embodiments, the dispersion includes between 2% and 50% by weight of refractory metal oxide including cationic dopants, in solid form (e.g., solid particulate form).

In some embodiments, The dispersion can include 0.001% or more (e.g., 0.01% or more, 0.1% or more, 1% or more, 5% or more, 10% or more, 15% or more, 20% or more, or 25% or more) and/or 30% or less (e.g., 25% or less, 20% or less, 15% or less, 10% or less, 5% or less, 1% or less, 0.1% or less, or 0.01% or less) by weight of the cationic dopant. In some embodiments, the dispersion includes between 0.001% and 30% by weight of cationic dopant.

The inorganic oxide binder particle can be contained within a dispersion (e.g., a colloidal suspension). When applied onto a substrate, the inorganic oxide binder particles bind particles of the dispersion together and bind a coating of refractory metal oxide to a substrate surface. The dispersion can include 0.001% or more (e.g., 0.01% or more, 0.1% or more, 1% or more, 5% or more, 10% or more, 15% or more, or 20% or more) and/or 30% or less (e.g., 20% or less, 15% or less, 10% or less, 5% or less, 1% or less, 0.1% or less, or 0.01% or less) by weight of an inorganic oxide binder particle. The inorganic oxide binder particle can include metallic or metalloid elements with oxygen. For example, the metallic or metalloid elements can include Al, Zr, Y, Ti, Mg, and/or Si, and the like. In some embodiments, the inorganic oxides include alumina, zirconia, yttria, titania, magnesia, aluminum silicate (e.g., zeolite), magnesia, and/or silica. The inorganic oxide binder particle can have an average maximum dimension of 5 nm or more and/or 50 nm or less.

In some embodiments, the inorganic oxide binder can be present in a colloidal dispersion that is acidic (i.e., having a pH less than 7). In turn, this acidic colloidal dispersion including the inorganic oxide binder is incorporated into a dispersion that can include a refractory metal oxide and a cationic dopant, a polymeric dispersion agent, a high molecular weight hydrophilic polymer viscosity aid, and/or a solvent, thereby rendering the entire dispersion acidic. Without wishing to be bound by theory, it is believed that an acidic dispersion can have reduced likelihood of particle aggregation and sedimentation, due to repulsive forces between the particles in the acidic environment. In some embodiments, the colloidal suspension and/or the dispersion can include an acid, such as nitric acid, phosphoric acid, sulfuric acid, lactic acid, citric acid, etc. In some embodiments the colloidal suspension and/or the dispersion can have a pH of 1, 2, 3, 4, 5, or 6 (e.g. a pH of 3, a pH of 4, or a pH of 5).

The dispersion can include a polymeric dispersion agent, which can assist in providing a homogeneous dispersion of urea conversion catalyst and inorganic oxide binder in a liquid. The polymer dispersion agent has a much lower molecular weight than the high molecular weight hydrophilic polymer viscosity aid and has both hydrophilic and hydrophobic properties. Without wishing to be bound by theory, it is believed that the hydrophobic regions of the polymeric dispersion agent can interact with the refractory metal particles and the inorganic oxide binder particles, while the hydrophilic regions can associate with water, thus helping to suspend or disperse the particles.

For example, the polymeric dispersion agent can include a poly(ethylene glycol)-co-polypropylene glycol) copolymer, polyvinyl alcohol, poly(methylmethacrylate), various copolymers thereof, and any combination thereof. In some embodiments, the polymeric dispersion agent can include partially hydrophilic and partially hydrophobic polymers (e.g., a poly(ethylene glycol)-co-polypropylene glycol) copolymer). The polymeric dispersion agent can have a molecular weight ($M_W$) of 300 daltons or more (e.g., 3,000 daltons or more, 20,000 daltons or more, 50,000 daltons or more) and/or 100,000 daltons or less (e.g., 150,000 daltons or less, 200,000 daltons or less, or 300,000 daltons or less). In some embodiments, the polymeric dispersion agent can serve both as a dispersion agent and a viscosity aid.

As used herein, "hydrophilic" refers to a molecule or portion of a molecule that has a tendency to interact with or be dissolved by water and other polar substances. As used herein, "polar" refers to a molecule that has a net dipole as a result of opposing charges from polar asymmetric bonds. And as used herein, "hydrophobic" refers to non-polar molecules.

The dispersion can include 0.001% or more (e.g., 0.01% or more, 0.1% or more, 1% or more, 5% or more, or 10% or more) and/or 15% or less (e.g., 10% or less, 5% or less, 5% or less, 1% or less, 0.1% or less, or 0.01% or less) by weight of a polymeric dispersion agent. For example, the dispersion can include between 0.001% and 15% by weight of polymeric dispersion agent, such as a poly(ethylene glycol)-co-polypropylene glycol) copolymer.

The dispersion can further include a high molecular weight hydrophilic polymer viscosity aid. The hydrophilic polymer viscosity aid can include poly(ethylene oxide), polyvinyl alcohol, polyvinylpyrrolidone, and/or polymethyl methacrylate, cellulose, etc. In some embodiments, the molecular weight of the hydrophilic polymer is 10,000 daltons or more (e.g., 100,000 daltons or more, 500,000 daltons or more, or 1,000,000 daltons or more.)

The amount of high molecular weight hydrophilic polymer viscosity aid in the dispersion can depend on a variety of factors, such as a desired dispersion viscosity, a temperature of the dispersion, proportions of urea conversion catalyst and inorganic oxide binder particle relative to other constituents of the dispersion, the molecular weight of the hydrophilic polymer viscosity aid, substrate-binding properties of the dispersion, and/or a desired porosity of the final urea conversion catalyst coating. The factors can be inter-related.

In some embodiments, the amount of high molecular weight hydrophilic polymer viscosity aid can vary depending on its molecular weight. For example, a dispersion including a relatively low amount of a higher molecular weight hydrophilic polymer viscosity aid can achieve a similar viscosity as a dispersion including a relatively high amount of a lower molecular weight hydrophilic polymer viscosity aid.

It is believed that a skilled practitioner would be able to determine an amount of a hydrophilic polymer viscosity aid to include in a dispersion, based on desired dispersion characteristics. For example, the dispersion can include 0.001% or more (e.g., 0.01% or more, 0.1% or more, 1% or more, or 3% or more) and/or 5% or less (e.g., 3% or less, 1% or less, 0.1% or less, 0.01% or less) by weight of high molecular weight hydrophilic polymer viscosity aid. In some embodiments, the dispersion includes between 0.001% and 5% by weight of the high molecular weight hydrophilic polymer viscosity aid.

The dispersion can include a solvent, examples of which include water and/or one or more organic solvent(s). The organic solvent can be polar. For example, the organic solvent can include alcohols, such as methanol, ethanol, propanol (e.g., n-propanol and/or isopropanol), butanol (e.g., n-butanol, sec-butanol, and/or tert-butanol), etc. When the solvent is a mixture of water and organic solvent, the solvent can include 20 vol % or more of water.

The dispersion can be made by stirring, sonicating, milling, or otherwise mixing a mixture including the urea conversion catalyst; the inorganic oxide binder; the polymeric dispersion agent, the high molecular weight hydrophilic polymer viscosity aid; and the solvent to provide a homogeneous dispersion.

The dispersion is then applied in one or more layers onto a surface (e.g., a surface of a urea decomposition reactor) by any suitable coating method, such as dip coating, spraying, or painting. For example, a dip coating process can include providing a porous substrate to be coated to a coating station, pumping a urea hydrolysis catalyst-containing dispersion into the porous substrate, and removing excess dispersion by applying a vacuum, by blowing with air, or by centrifuging, to provide a reproducibly uniform coating. The coated substrate can then be air dried, and/or dried at 105-120° C. to remove water and other solvents. The coating process may be repeated one or more times to achieve a required catalyst loading, before calcining (or sintering) at elevated temperatures (typically 400-600° C. range) to remove organic compounds.

In some embodiments, calcining (or sintering) includes heating the dispersion-coated urea decomposition reactor to a temperature of 300° C. or more (e.g., 400° C. or more, 500° C. or more, or 600° C. or more) and/or 700° C. or less (e.g., 600° C. or less, 500° C. or less, or 400° C. or less) to provide a urea conversion catalyst coating, which can include an inorganic oxide binder. During sintering, organic matter and solvents are removed from the urea conversion catalyst and inorganic oxide binder. The urea conversion catalyst and inorganic oxide binder particles can fuse together to form a layer.

Methods of Using the Urea Conversion Catalyst

Once coated with the urea conversion catalyst, the urea decomposition reactor can be used in an engine aftertreatment system. During use, a stream of engine exhaust that is dosed with urea can flow through the urea decomposition reactor, where the decomposition rector decomposes the urea to ammonia and water. The ammonia can then be used to reduce NOx in the engine exhaust. The exhaust can then flow to an optional selective catalyst reduction system.

In some embodiments, the urea decomposition reactor can be operated at a temperature of 130° C. or more (e.g., 200° C. or more, 300° C. or more, or 400° C. or more) and/or 500° C. or less (e.g., 400° C. or less, 300° C. or less, or 200° C. or less).

The following examples are included for the purpose of illustrating, not limiting, the described embodiments.

Example 1 describes the screening of urea conversion catalysts using thermogravimetric analysis. Example 2 describes a urea conversion catalyst washcoat composition. Example 3 describes coating of a urea conversion catalyst on a cordierite monolith. Example 4 tests the stability of a urea conversion catalyst washcoat on cordierite core samples. Example 5 describes a wire-mesh mixer that has been coated with a urea conversion catalyst.

EXAMPLES

Example 1

Urea Hydrolysis Catalyst Screening with 50% Urea Using Thermogravimetric Analysis Zirconium hydroxide and 8 mol % yttrium stabilized zirconium hydroxide were obtained from MEL Chemicals Inc. and were calcined at 1,000° C. for 4 hours. A 30% weight decrease accompanied the transformation from hydroxide to oxide and the thermally induced phase transition. All other metal oxides (and other reagents) in these studies were obtained from Sigma-Aldrich Co. LLC. A representative list of metal oxides that were evaluated to determine their ability to catalyze urea hydrolysis is given in Table 1.

50% urea solution (PCS Nitrogen Inc.) was added to a thermo-gravimetric analysis (TGA) pan made from alumina (due to its inert qualities). Each metal oxide in powder form was also placed in the alumina pan, and the temperature was increased to 600° C. at a selected rate in $N_2$ (flowing at 90 mL/min), then continuing on to 800° C. in air (flowing at 90 mL/min), using a Thermo Scientific TGA 500 instrument. The $NH_3$ and HNCO gaseous decomposition products were analyzed by FTIR spectroscopy. Temperature increase was conducted at rates of: 3.3, 10, 20, and 30° C./min.

Control experiments were conducted with 50% urea solution only, using both alumina and platinum (Pt) TGA pans, to determine the relative catalytic activity of the YSZ-8 urea hydrolysis catalyst.

TABLE 1

Metal oxides screened for urea hydrolysis catalytic activity.

| Item | Catalyst/Urea | Urea | Biuret/ Triuret | Cyanuric Acid | Ammelide (etc) | % LMAl | % HMAr | % Urea Unaccounted For |
|---|---|---|---|---|---|---|---|---|
| 1 | NiO-YSZ (8 mg)/50% Urea (77.6 mg) | 27.8 | 1.8 | 9 | 1.6 | 73.6 | 26.4 | 0 |
| 2 | YSZ-8 (7 mg)/50% Urea (40.7 mg) | 15.4 | 5.8 | 3.9 | — | 81.2 | 18.8 | 0 |
| 3 | ScSZ-10 (5 mg)/50% Urea (72.4 mg) | 24.7 | 2.2 | 8.8 | 1 | 73.3 | 26.7 | 0 |
| 4 | NiO-ScSZ (7 mg)/50% Urea (29.1 mg) | 11.4 | 0.9 | 2.8 | 0.1 | 80.9 | 19.1 | 0 |
| 5 | YSC-10 (8 mg)/50% Urea (55.5 mg) | 20.4 | 1.3 | 6 | 0.7 | 76.4 | 23.6 | 0 |
| 6 | LSC82-1 (6 mg)/50% Urea (13.9 mg) | 5.2 | — | 0.9 | 0.2 | 69.3 | 14.7 | 16 |
| 7 | LSC82-2 (8 mg)/50% Urea (98.9 mg) | 33.3 | 2 | 8.7 | 2.5 | 68.5 | 23.6 | 7.9 |
| 8 | YSZ-3 (6 mg)/50% Urea (28.5 mg) | 20 | 1 | 6.2 | 1.3 | 73.7 | 26.3 | 0 |
| 9 | YSZ-20 (20 mg)/50% Urea (20.6 mg) | 13.6 | 3.5 | 3.2 | 0.3 | 84 | 16 | 0 |

TABLE 1-continued

Metal oxides screened for urea hydrolysis catalytic activity.

| Item | Catalyst/Urea | Urea | Biuret/ Triuret | Cyanuric Acid | Ammelide (etc) | % LMAl | % HMAr | % Urea Unaccounted For |
|---|---|---|---|---|---|---|---|---|
| 10 | TiO$_2$ (6 mg)/50% Urea (25.8 mg) | 18.6 | 1.7 | 5 | 0.7 | 77.6 | 22.4 | 0 |
| 11 | CeO$_2$—ZrO$_2$ (4 mg)/Urea (25.3 mg) | 18.6 | 1.2 | 4 | 1.3 | 79 | 21 | 0 |

LMAl: low molecular weight aliphatics.
HMAr: high molecular weight aromatics
YSZ: yttria-stabilized zirconia
YSZ-8: 8 mol % yttria-stabilized zirconia
YSZ-3: 3 mol % yttria-stabilized zirconia
YSZ-20: 20 mol % yttria-stabilized zirconia
ScSZ-10: 10 mol % scandia-stabilized zirconia
LSC82-1: lanthanum strontium cobalt oxide (run #1)
LSC82-2: lanthanum strontium cobalt oxide (run #2)
YSC-10: 10 mol % yttria stabilized ceria
NiO-YSZ: nickel oxide (66 wt %) - yttria stabilized zirconia (34 wt %)
NiO-ScSZ: nickel oxide (66 wt %) - 10 mol % scandia stabilized zirconia (34 wt %)

The ability of a catalyst to produce mostly low molecular weight aliphatic compounds (LMAl), as opposed to high molecular weight aromatic (HMAr) compounds, is a direct measure of its ability to hydrolyze urea to NH$_3$ under engine exhaust conditions, such that a catalyst that produces more LMAl compared to HMAr is a better catalyst. A large range of potential candidates have been uncovered based upon the LMAl vs. HMAr screening criterion.

Other criteria can also be important. For example, a catalyst should not be consumed in the reaction. In Table 1, the catalysts in Items 6 and 7 appear to be participating in side reaction(s), such that a mass balance for urea could not be obtained. Indeed, color changes to the catalysts in Items 6 and 7 were observed, which suggested that relatively stable adduct/coordination complex had been formed in these cases. These materials are therefore not suitable as urea hydrolysis catalysts.

The catalysts in Items 5 and 11 have oxidative properties and have been used as key components in DOC catalysts. As such, there is concern that in addition to effectively catalyzing urea hydrolysis, these and other candidates may also catalyze undesirable oxidative side reactions (including NH$_3$ oxidation). This is further investigated in Example 4.

Figure 5:
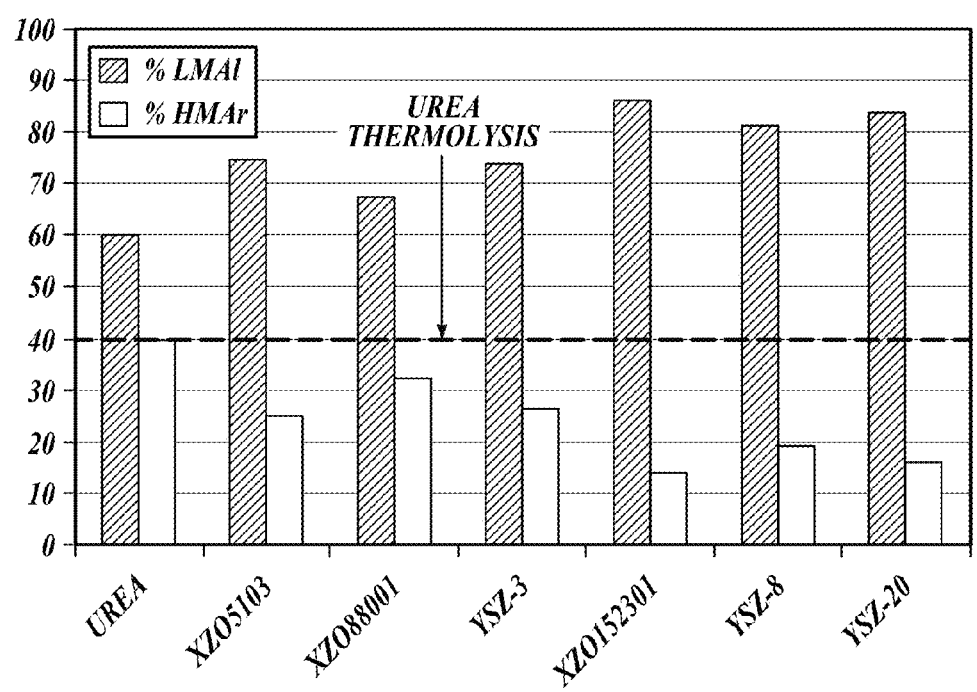
FIG. 5 is a graph comparing generation of low molecular weight aliphatic and high molecular weight aromatic compounds from urea, for various embodiments of urea conversion catalysts.

Doped zirconia was shown to be a suitable urea hydrolysis catalyst. Specifically, FIG. 5 shows that the relative activity for urea hydrolysis varied directly with the yttria (dopant) content, where greater yttria content correlated with greater urea hydrolysis activity. Referring to FIG. 6, catalysts XZO5103 and XZO880-01 were derived from different grades of zirconium hydroxide, and catalyst XZO1523-01 was derived from zirconium hydroxide doped with 8 mol % yttrium, from MEL Chemicals Inc. All other catalysts were obtained from Sigma-Aldrich Co. LLC. A progressive improvement in urea hydrolysis catalytic activity was shown in FIG. 5 as yttria content increased to 8 mol %, relative to a urea-only sample. The improvement in urea hydrolysis catalytic activity leveled off at about 20% yttria dopant. In comparison, when only urea was in the alumina TGA pan, thermolysis was the dominant mechanism for urea hydrolysis, resulting in formation of a relatively high percentage of HMAr compounds.

Figure 6A:
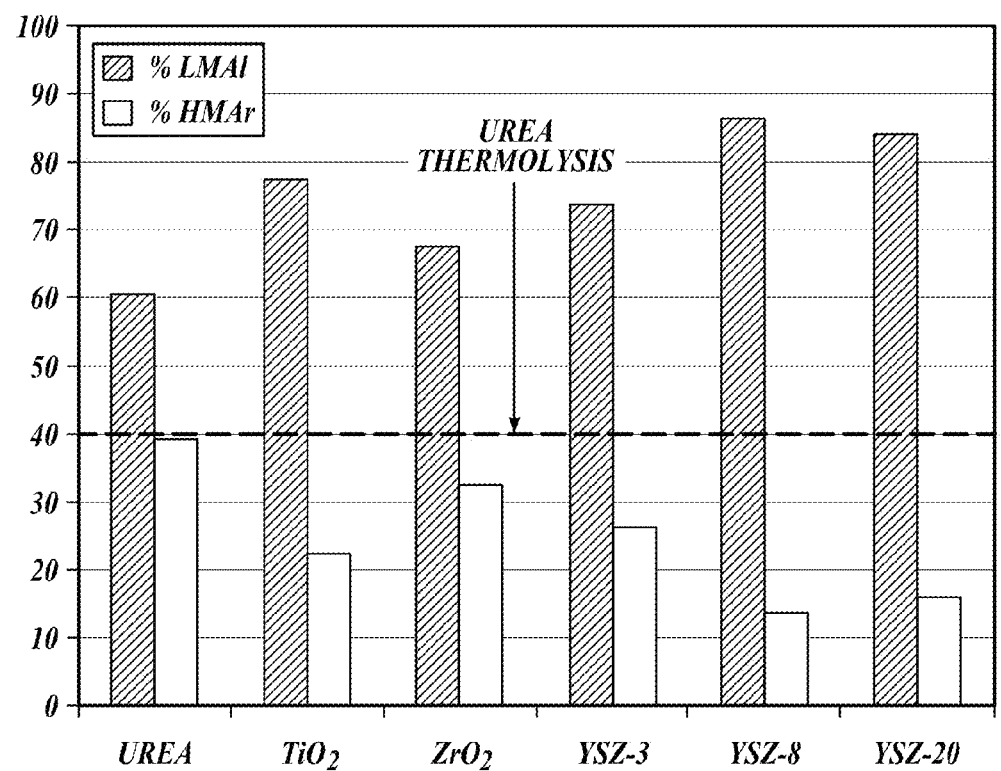
FIG. 6A is a graph comparing generation of low molecular weight aliphatic and high molecular weight aromatic compounds from urea, for various embodiments of urea conversion catalysts.
Figure 6B:
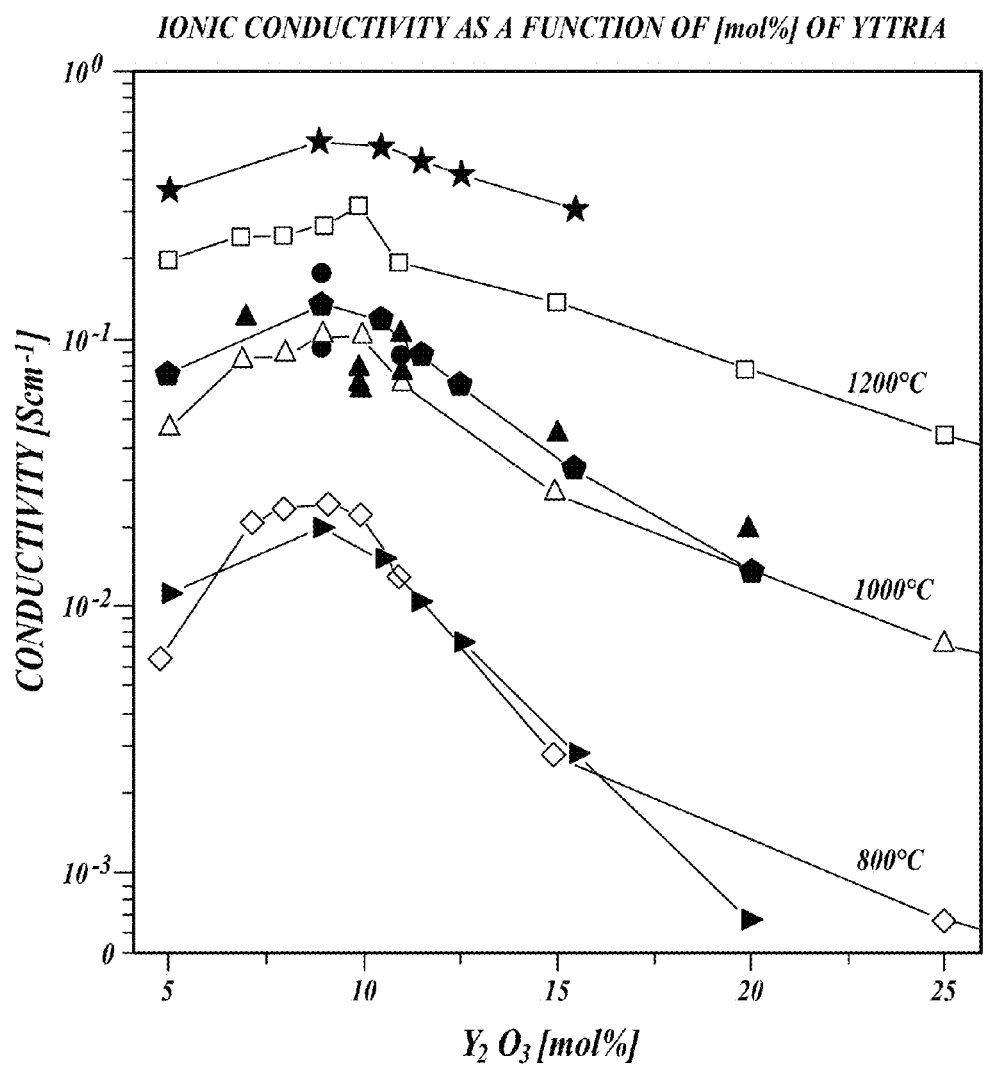
FIG. 6B is a graph showing ionic conductivity as a function of mol % yttria in embodiments of urea conversion catalysts, at various temperatures.

FIG. 6A shows the relative ability of the various zirconia/yttria catalyst compositions, as well as titania, in catalyzing urea hydrolysis. FIG. 6B shows a strikingly similar relationship between the catalyst behavior in FIG. 6A and the ionic conductivity of zirconia as a function of yttria content; implicating lattice vacancies (due to the dopant) as active catalytic sites.

Table 2 illustrates another important selection criterion for the urea hydrolysis catalyst. Specifically, there was a direct relationship between the observed wettability of the catalyst powder to 50% urea solution and the efficacy for catalyzing urea hydrolysis, as measured by the LMAl/HMAr ratio. Referring to Table 3, the water storage capacity of zirconia was similar to that of titania, peaking at 8 mol % yttria and leveling off at levels as high as 20 mol %. The improved wettability could be attributed to the effect of the dopant on the surface properties of the catalyst.

TABLE 2

Physical properties of selected catalysts screened for urea hydrolysis activity.

| COMPOSITION | SOURCE | IDENTIFIER | SIZE (μm) | SURFACE AREA (m$^2$/g) | WET-TABLE | % LMAl/% HMAr (from 50% Urea) |
|---|---|---|---|---|---|---|
| Zirconium Dioxide | MEL Chemicals | ZiO$_2$ | 1 | >250 | Poor | 67.5%:32.5% |
| 3 mol % Yttria Stabilized Zirconium Dioxide | Sigma-Aldrich | YSZ-3 ZrO$_2$:3 mol % Y | ~0.1 | 10-25 | Poor | 73.7%:26.3% |
| 8 mol % Yttria Stabilized Zirconium Dioxide | MEL Chemicals | XZO1523/01 ZrO$_2$:8 mol % Y | 5 | >250 | Highly | 86.3%:13.7% |
| 20 mol % Yttria Stabilized Zirconium Dioxide | Sigma-Aldrich | YSZ-20 ZrO$_2$:20 mol % | <0.1 | Not available | Highly | 84%:16% |
| Titanium (IV) Oxide, | Sigma- | TiO$_2$ | <0.1 | Not available | Poor | 77.6%:22.4% |

TABLE 2-continued

Physical properties of selected catalysts screened for urea hydrolysis activity.

| COMPOSITION | SOURCE | IDENTIFIER | SIZE (μm) | SURFACE AREA (m²/g) | WET-TABLE | % LMAl/% HMAr (from 50% Urea) |
|---|---|---|---|---|---|---|
| Anatase | Aldrich | | | | | |
| Alumina TGA Pan Control | — | Pan Only | — | — | Poor | 60.5%:39.5% |

TABLE 3

Relative water storage capacity of porous titania, zirconia, alumina, and silica.

| Sample | Average particle size (μm) | Average pore size (nm) | Total pore volume (cm³/g) | Amount of adsorbed water (μmol/m²)[a] |
|---|---|---|---|---|
| Titania 100A | 5 | 12.5 | 0.20 | 22.1 |
| Zirconia PICA-7 | 2.5 | 25.8 | 0.15 | 19.6 |
| Aluspher® AL100 alumina | 5 | 10.7 | 0.50 | 29.7 |
| LiChrospher® Si-100 silica | 10 | 12.9 | 1.23 | 10.2 |

[a] Amount of physically and/or chemically adsorbed water was estimated using TGA measurements from the mass-loss at 623 K.

Figure 7A:
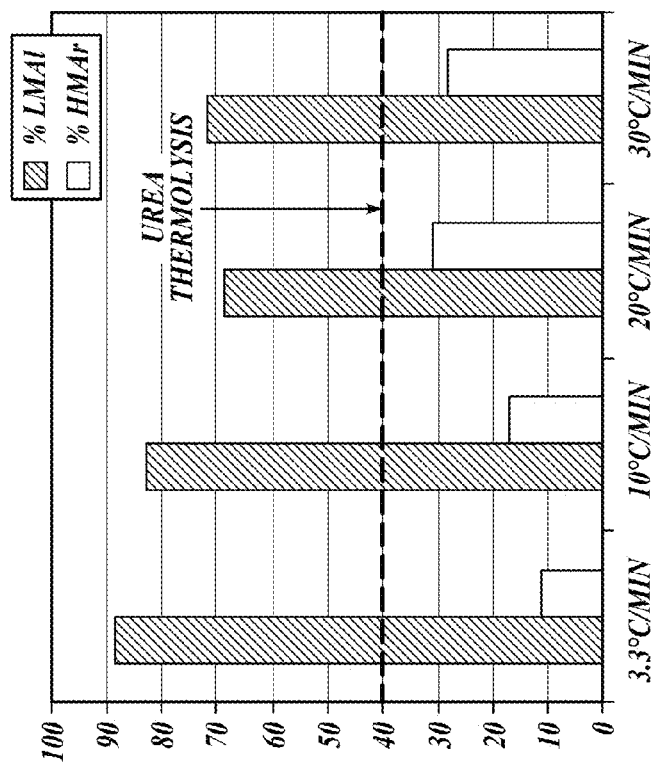
FIG. 7A is a graph comparing generation of low molecular weight aliphatic and high molecular weight aromatic compounds from urea at different temperature ramp rates for an embodiment of a urea conversion catalyst.
Figure 7B:
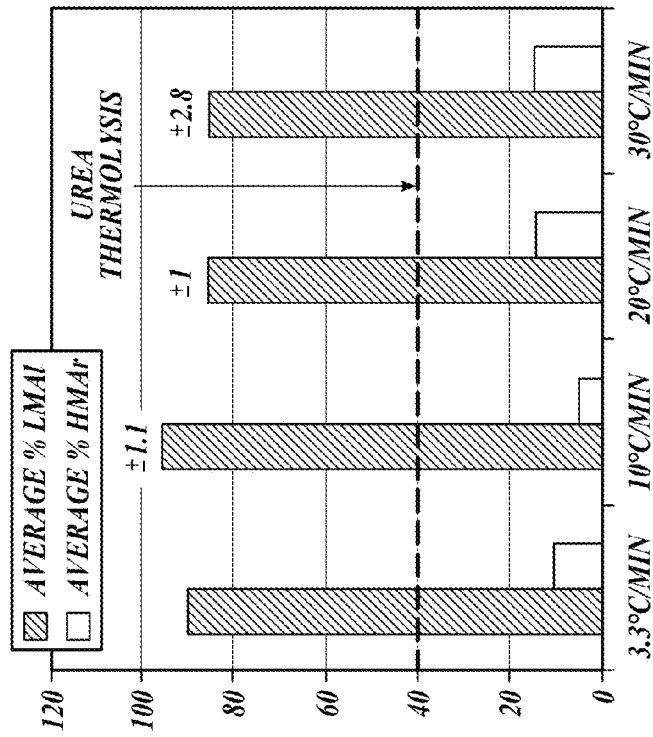
FIG. 7B is a graph comparing generation of low molecular weight aliphatic and high molecular weight aromatic compounds from urea at different temperature ramp rates for platinum.

FIGS. 7A and 7B show the effect of the rate of temperature increase (i.e., temperature ramp rate) on the relative efficacy of the catalyst for urea hydrolysis. FIG. 7A shows the effect of temperature ramp rate on 8 mol % yttria doped zirconia (YSZ-8, from MEL Chemicals) in an alumina TGA pan. FIG. 7B shows the effect of ramp rate in a platinum TGA pan, with only urea. Two main conclusions can be drawn: First, 8 mol % yttria doped zirconia was a superior catalyst for urea hydrolysis to platinum, under the experimental conditions. The general tendency for a decline in performance with increasing rate of heating, for both yttria doped zirconia and platinum, was likely related to the increase rate of removal of water. For example, the water storage capacity of 8 mol % yttria doped zirconia was more effective under the experimental conditions. Thus, under engine exhaust conditions, where there is an abundance of water, improved urea hydrolysis performance with yttria-doped zirconia could be achieved. Second, the ability of platinum to catalyze many reactions can increase the likelihood that undesirable side reactions would likely accompany urea hydrolysis (such as $NH_3$ oxidation, and $NO \rightarrow NO_2$ oxidation), when platinum is used to catalyze urea hydrolysis.

Example 2

Catalyst Washcoat Applied to Alumina TGA Pan

Liquid washcoat compositions (also referred to as "dispersions" in the Detailed Description) as shown in Table 4 were prepared, and they were coated onto alumina TGA pans with a fine camel hair brush. The exemplary washcoats are useful for applying a urea conversion catalyst to a surface of a urea decomposition reactor, such as those disclosed in the embodiments herein. After a brief period of drying in a stream of air, the coated pans were dried at 105° C. in an air oven. A second coating was sometimes applied in selected cases. The washcoat was calcined for 1 hr at 450° C. Relative durability of the coating was determined by weighing before and after applying a blast of $N_2$ at 70 psig.

TABLE 4

Washcoat Compositions for Coating TGA Pans.

| Ingredient | YSZ-8 | YSC-10 | YSZ-8/YSC-10 | $CeO_2$—$ZrO_2$ | YSZ-8/$CeO_2$—$ZrO_2$ |
|---|---|---|---|---|---|
| YSZ-8 | 23.6% | 30% | 27.3% | — | 27.3% |
| YSC-10 | — | — | 9.1% | — | — |
| $CeO_2$—$ZrO_2$ | — | — | — | 17.7% | 9.1% |
| PEG/PPG | 3.9% | 5% | 4.5% | 5.9% | 4.6% |
| NYACOL® ZR 10/15 | 21.3% | 27% | — | 31.8% | 24.6% |
| Lactic Acid | — | — | 4.5% | — | — |
| Deionized Water | 29.9% | 38% | 54.6% | 44.7% | 34.6% |

YSC-10: 10 mol % yttria stabilized ceria.
PEG/PPG: poly (ethylene glycol-co-propylene glycol).

Results from TGA evaluation with 50% urea and durability testing are shown in Table 5.

TABLE 5

TGA and durability evaluation of catalyst washcoats applied to alumina TGA pans.

| WASHCOAT | %50 Urea TGA [% LMAl:% HMAr] | 70 psi $N_2$ Test | % Weight Loss |
|---|---|---|---|
| YSZ-8 Single Layer | 87%:13% | Pass | 0% |
| YSZ-8 Double Layer | 80%:20% | Pass | 6% |
| YSC | 80.4%:19.6% | Marginal | 25% |
| YSZ-8/YSC | 87.5%:12.5% | Fail | 100% |
| $CeO_2$—$ZrO_2$ | 88.2%:11.8% | Fail | 100% |
| YSZ/$CeO_2$—$ZrO_2$ | 88.5%:11.5% | Pass | 20% |

Based upon washcoat (YSZ-8/YSC-10) in Table 4, with a total composition of 8.5 g, varying amounts NYACOL® ZR 10/15 colloidal dispersion was added to washcoats and coated onto alumina TGA pans. Evaluation by TGA and durability testing were carried out. The effect of varying NYACOL® ZR 10/15 composition is given in Table 6.

TABLE 6

Impact of NYACOL® ZR 10/15 content in washcoat on urea hydrolysis and coating durability.

| WASHCOAT [0.5 g PEO/PPO] | %50 Urea TGA [% LMAl:% HMAr] | 70 psi $N_2$ Test | % Weight Loss |
|---|---|---|---|
| YSZ-8/YSC [0.0 mL NYACOL® ZR 10/15] | 87.5%:12.5% | Fail | 100% |
| YSZ-8/YSC [2.7 mL NYACOL® ZR 10/15] | 87.9%:12.1% | Pass | 0% |
| YSZ-8/YSC [3.5 mL NYACOL® ZR 10/15] | 95.3%:4.7% | Marginal | 27% |

TABLE 6-continued

Impact of NYACOL ® ZR 10/15 content in washcoat on urea hydrolysis and coating durability.

| WASHCOAT [0.5 g PEO/PPO] | %50 Urea TGA [% LMAl:% HMAr] | 70 psi $N_2$ Test | % Weight Loss |
|---|---|---|---|
| YSZ-8/YSC [4.5 mL NYACOL ® ZR 10/15] | 91.4%:8.6% | Marginal | 26% |
| YSZ-8/YSC* [6 mL NYACOL ® ZR 10/15] | 84.7%:15.3% | Fail | 57% |

Note:
*Very high viscosity
YSC-10: 10 mol % yttria stabilized ceria

Likewise, the effect of varying PEG/PPG content is shown in Table 7.

TABLE 7

Impact of PEG/PPG content in washcoat on urea hydrolysis and coating durability.

| WASHCOAT [2.7 mL NYACOL ® ZR 10/15] | %50 Urea TGA [% LMAl:% HMAr] | 70 psi $N_2$ Test | % Weight Loss |
|---|---|---|---|
| YSZ-8/YSC-10 [0.5 g PEG/PPG] | 87.9%:12.1% | Pass | 0% |
| YSZ-8/YSC-10 [1.0 g PEG/PPG] | 89.9%:10.1% | Pass | 0% |
| YSZ-8/YSC-10 [1.5 g PEG/PPG] | — | Fail | 67% |

As shown in Table 5, a single layer coating of YSZ-8, a double layer coating of YSZ-8, and a coating of YSZ/$CeO_2$—$ZrO_2$ compositions of Table 4 provided stable coatings with minimal weight loss when subjected to a 70 psi $N_2$ test. As shown in Table 7, a PEG/PPG content of 0.5 g and 1.0 g for a washcoat composition including YSZ-8/YSC-10 provided stable coatings with no weight loss when subjected to a 70 psi $N_2$ test.

Example 3

Urea Hydrolysis Catalyst Coated on Cordierite Monolith

Figure 8:
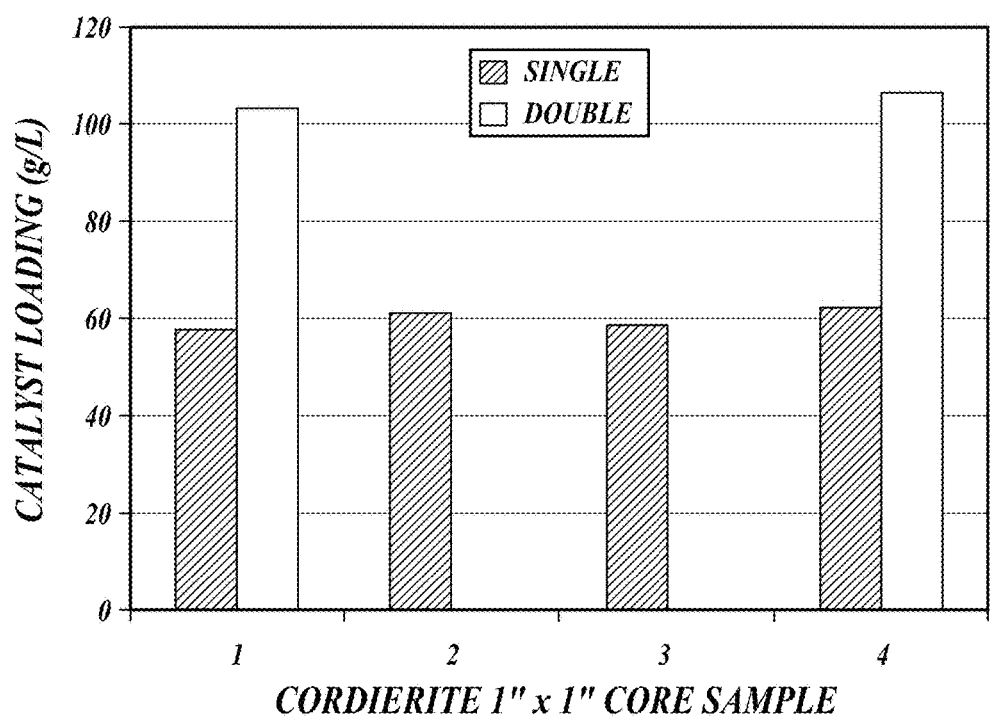
FIG. 8 is a graph showing loading of an embodiment of a urea conversion catalyst.

The following washcoat composition was dip coated onto a cordierite (5/300) substrate (available from NGK Automotive Ceramics, U.S.A., Inc.), in the form of 1"×1" core samples at 30° C., with a vacuum applied to pull excess washcoat through the channel and assist in drying: 25.6% YSZ-8; 8.3% YSC-10; 19.9% Nyacol®; 3.4% PEG/PPG % YSZ; 0.3% PEO; and 42.2% DI water. The washcoat was dried at 105° C. in air and calcined at 450° C. for 1 hr. Catalyst loading levels for this washcoat composition onto core samples, which have received single and double coating, are shown in FIG. 8.

Example 4

DOC Light-Off Testing of Catalyst Washcoat on Cordierite Core Samples

A synthetic gas test bench for testing catalyst core samples was employed to evaluate various catalyst washcoats for their ability to activate undesirable oxidative side reactions. This would also provide insight into their potential ability to oxidize the $NH_3$ produced from urea.

Selected core samples prepared in Example 3 were evaluated in a DOC lightoff experiment. A fresh core sample from a commercial DOC catalyst was used as a reference.

The gas mixture used to simulate a diesel exhaust is given in Table 8. The temperature was increased from 160° C. to the setpoint of 600° C., where it was allowed to stabilize. Heating was then discontinued and both the inlet temperature and the reactor outlet gas concentration were monitored. From the results, conversion efficiencies were computed and plotted to obtain the temperature at which 50% of the total conversion efficiency was achieved for CO conversion to $CO_2$ ($T_{50}$ CO); NO conversion to $NO_2$ ($T_{50}$ NO); and $C_2H_4$ conversion to $CO_2$ and $H_2O$ ($T_{50}$ $C_2H_4$).

TABLE 8

Gas mixture used in synthetic gas test bench.

| Gas | Concentration |
|---|---|
| Nitric Oxide (NO) | 600 ppm |
| Ethylene ($C_2H_4$) | 75 ppm C2 |
| Carbon Monoxide (CO) | 300 ppm |
| Oxygen ($O_2$) | 10 percent |
| Carbon Dioxide ($CO_2$) | 5.6 percent |
| Water ($H_2O$) | 6 percent |
| Nitrogen ($N_2$) | Balance |

The results were shown in Table 9, where all of the tested catalysts could potentially be employed for urea hydrolysis, because they exhibited no capability to activate undesirable oxidative side reactions below 500° C. (a temperature range where urea dosing occurs during engine operation).

TABLE 9

DOC light-off properties of urea hydrolysis catalysts on cordierite (1" × 1") core samples.

| CATALYST | $T_{50}CO$ (° C.) | $T_{50}NO$ (° C.) | $T_{50}C_2H_4$ (° C.) |
|---|---|---|---|
| Commercial DOC Catalyst | 138 | 242 | 247 |
| YSZ-8 | >600 | N/A | 581 |
| YSZ-8/YSC-10 | 586 | N/A | 590 |
| YSZ-8/$CeO_2$—$ZrO_2$ | 550 | N/A | 573 |
| YSC-10 | 583 | N/A | 592 |

Example 5

Wiremesh Mixer Coated with Urea Hydrolysis Catalyst Substrate Pretreatment

A wiremesh mixer (ACS Industries, Inc) having a 4.5" outer diameter was degreased with isopropanol and etched in 1M NaOH in an ultrasonic bath for 20 minutes. Thorough washing with DI water was followed by a second 20 minute session in the ultrasonic bath, in the presence of 1M HCl. The wiremesh substrate was given a final wash and dried with isopropanol under a stream of air.

A suspension of the following composition was prepared: 34.2% YSZ-8 (XZO1523/01) from MEL Chemicals; 0.3% poly(ethylene oxide), Mv~300,000; 3.4% poly(ethylene glycol-co-propylene glycol), Mn~2,500; 19.9% NYACOL® ZR10/15 (NYACOL Nano Technologies, Inc); and 42.2% DI water. Mixing was carried out for 60 minutes with a SPEX SamplePrep 8000 Mixer/Mill to provide a wash coat composition.

The wash coat composition was applied at 30° C. by immersion of the wiremesh substrate into the suspension and using a blast of pressurized air from a TECHSPRAY Duster canister to remove excess washcoat material.

After a brief period of drying in a stream of air, the newly applied washcoat was dried at 105° C. in an air oven for at least 15 minutes. By comparing the weight before and after applying the washcoat, the catalyst loading was determined. A second coating was applied to the same wire mesh mixer in like manner, to increase the catalyst loading.

The catalyst was then calcined at 500° C. for 60 minutes in an air oven.

The first wash coat loading was 1.673 g. The second wash coat loading was 1.875 g. A final catalyst loading of 3.459 g was observed on a 4.5" OD wiremesh mixer.

Durability was demonstrated by exposing the coated device to a sustained stream of $N_2$ gas at 70 psig. The resulting weight loss was 1.24%, thereby indicating that a highly durable coating has been achieved.

While illustrative embodiments have been illustrated and described, it will be appreciated that various changes can be made therein without departing from the spirit and scope of the invention.

The invention claimed is:

1. A coating composition for a urea decomposition reactor, comprising:
   a dispersion comprising a urea conversion catalyst comprising a refractory metal oxide and a cationic dopant, between 0.001 wt % and 15 wt % poly(ethylene glycol)-co-poly(propylene glycol) copolymer;
   an inorganic oxide binder particle;
   a high molecular weight hydrophilic polymer viscosity aid; and
   a solvent.

2. The coating composition of claim 1, wherein the dispersion comprises between 2 wt % and 50 wt % refractory metal oxide.

3. The coating composition of claim 1, wherein the dispersion comprises between 0.001 wt % and 30 wt % cationic dopant.

4. The coating composition of claim 1, wherein the composition comprises between 0.001 wt % and 5 wt % high molecular weight hydrophilic polymer viscosity aid.

5. The coating composition of claim 1, wherein the dispersion is a colloidal dispersion.

* * * * *